Nov. 4, 1952 P. STRAUSS 2,616,707
MECHANISM FOR REPRODUCING RECORDED SOUNDS IN TOYS
Filed Nov. 2, 1950 3 Sheets-Sheet 1

*Inventor*
Pedro Strauss

By Clarence A. O'Brien
and Harvey B. Jackson
*Attorneys*

Nov. 4, 1952           P. STRAUSS           2,616,707
MECHANISM FOR REPRODUCING RECORDED SOUNDS IN TOYS
Filed Nov. 2, 1950           3 Sheets-Sheet 2
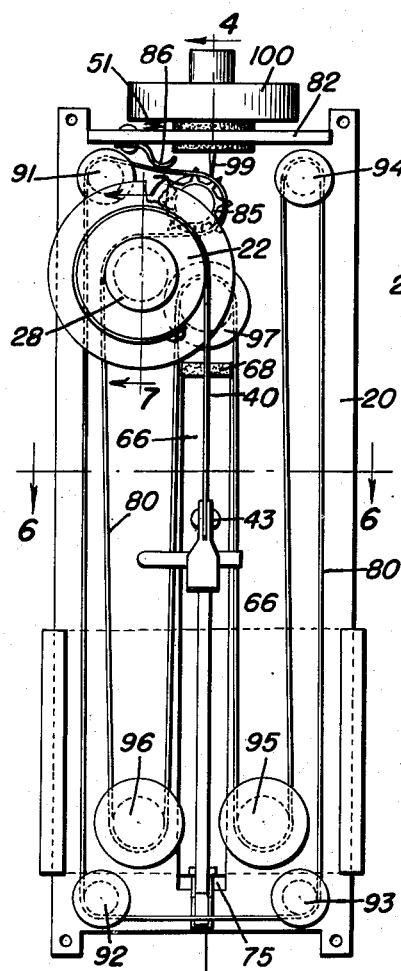
Fig.2
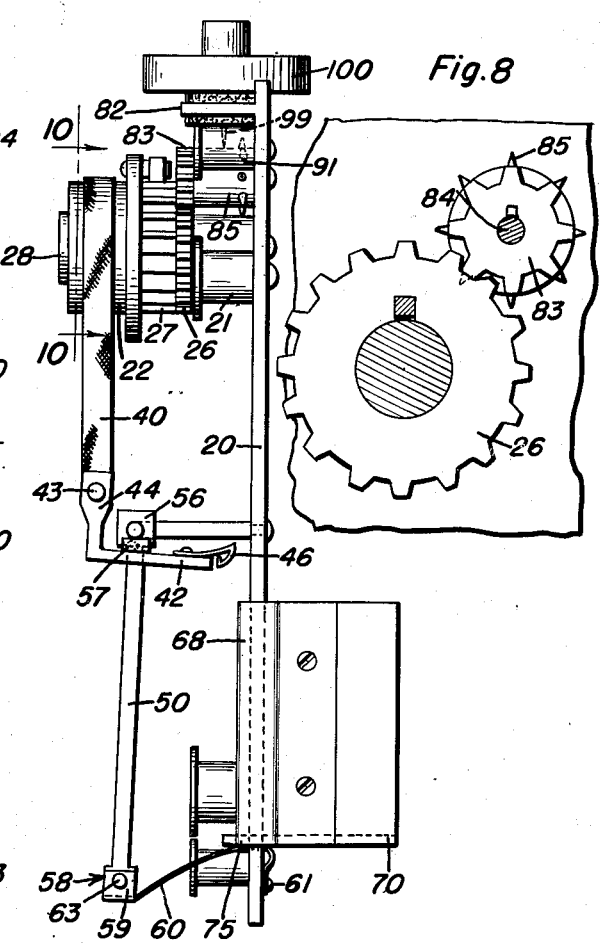
Fig.3
Fig.8
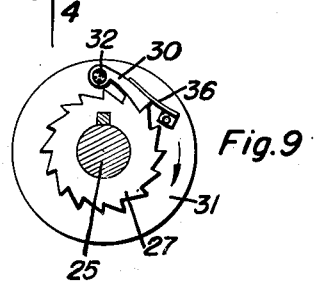
Fig.9
Inventor
Pedro Strauss
By *Clarence A. O'Brien and Harvey B. Jacobson*
Attorneys

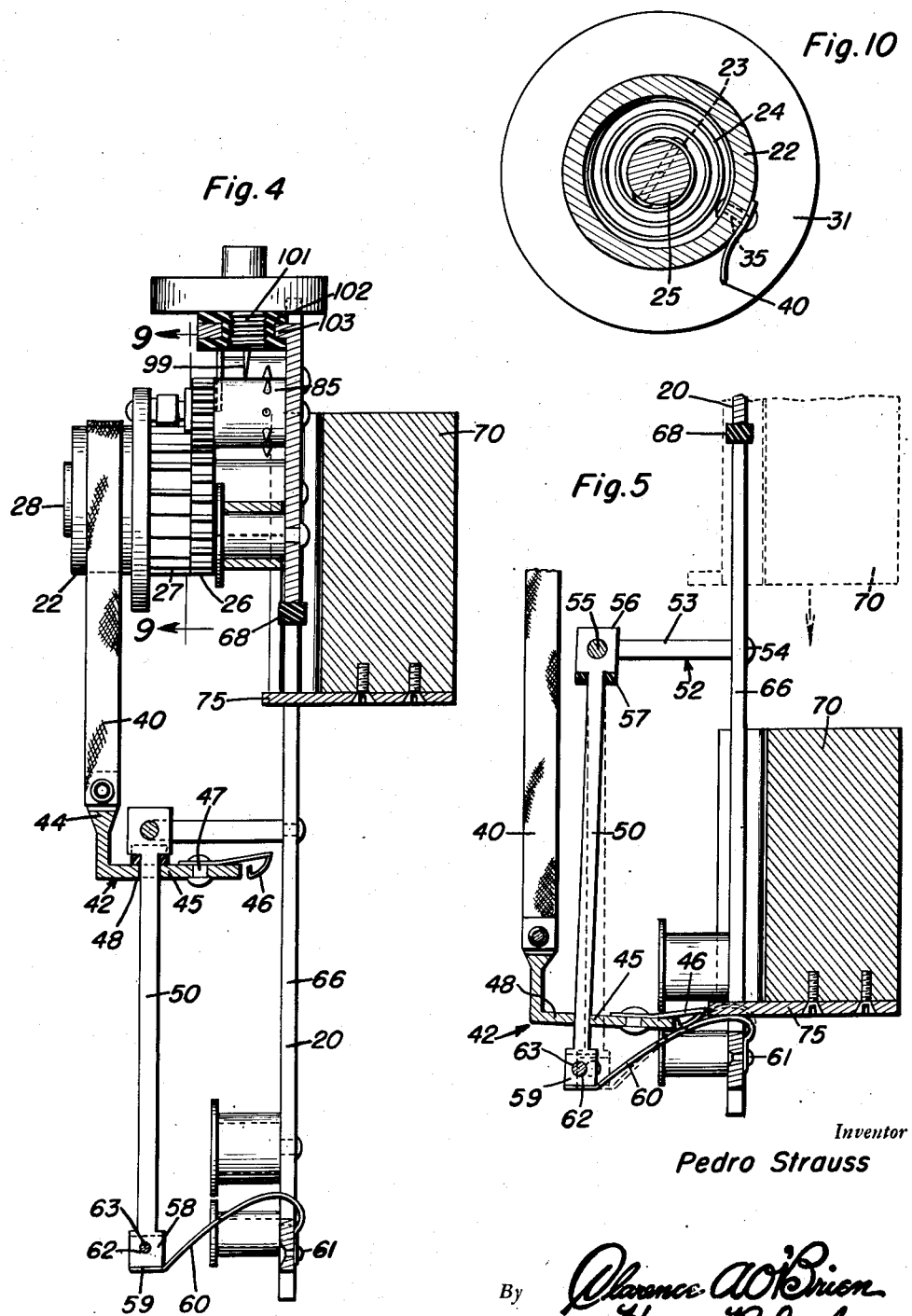

Patented Nov. 4, 1952

2,616,707

UNITED STATES PATENT OFFICE 2,616,707

MECHANISM FOR REPRODUCING RECORDED SOUNDS IN TOYS

Pedro Strauss, Caracas, Venezuela

Application November 2, 1950, Serial No. 193,580

5 Claims. (Cl. 274—11)

This invention relates to the reproduction of recorded sound or speech pattern by means of a mechanism which is housed in the interior of a toy, such as described in my earlier Patent No. 2,212,623, and it has for its main object to provide an improvement of said mechanism which permits reducing the dimensions of the recording and reproducing mechanism, to materially increase the number and variety of words or the variety of sound effects which may be recorded and reproduced and which further permits simplifying the weight-operated spring tensioning mechanism which drives the sound record as well as the automatic means for releasing and resetting the spring, thus making the mechanism less expensive and more fool-proof, while at the same time producing a greater variety of sound effects.

More specific objects of the invention are set forth in the following specification, which describes the invention by way of example and with reference to the accompanying drawings.

In the drawings and in the accompanying specification, only one modification of the invention is illustrated and described by way of example. But it is to be understood that the example shown and described has been selected in order to illustrate the principle of the invention and to explain the best mode of applying the principle. The specification and drawings do not attempt to give a survey of possible modifications of the invention, and a modification of the example described and shown is therefore not necessarily a departure from the principle of the invention.

In the drawings:

Figure 2 is an elevational side view of the mechanism.

Figure 3 is an elevational end view of the mechanism.

Figure 4 is an elevational sectional end view of the mechanism, on an enlarged scale, the section being taken along line 4—4 of Figure 2.

Figure 5 is a view similar to Figure 4 but showing the parts in another phase of the operation.

Figure 8 is a front view of the gear wheels.

Figure 9 is an elevational front view of the ratchet wheel and drum, the main shaft being shown in section.

Figure 10 is an elevational front partly sectional view of the spring drum and the coil spring in the interior of the same, the section being taken along line 10—10 of Figure 3.

Figure 1:
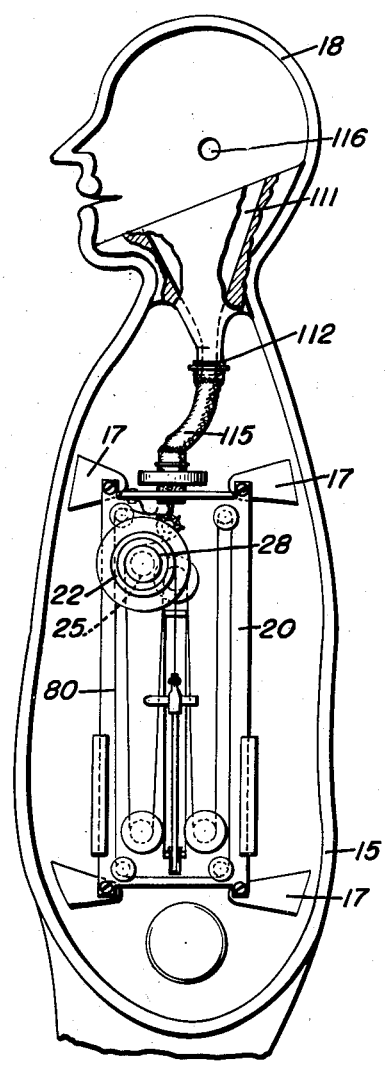
Figure 1 is an elevational view, partly in section, of one-half of the body of the doll with the mechanism for sound reproducing being shown in elevation.

In my aforesaid earlier Patent No. 2,212,623, it has been proposed to provide toys, and especially dolls and animal toys, with a sound recording mechanism capable of reproducing sounds or sound patterns, the equipment necessary for this purpose consisting in an endless sound strip which carries the sound track and in a sound box with a needle running over said track, said mechanism being housed and mounted in the hollow interior of the doll, toy or character figure. According to this earlier invention, the endless sound strip was driven by means of sprocket wheels arranged at a distance. The sound strip ran over these two sprockets in a single loop. One of the sprocket wheels was driven by a spring-actuated pulley. The spring was capable of moving the sprocket wheels for a number of revolutions which corresponded approximately to the full length of the sound track. When unwound, the spring was rewound by a cable attached to and wound on the pulley and said cable was further attached to a carriage which was moved by a weight, the downward movement of which moved the carriage and the cable downwardly, thereby rotating the pulley to which the cable was attached in the proper direction for rewinding of the spring.

According to the present invention, the strip carrying the sound track is of much greater length and consists of a number of parallel sections stretched between guide rollers and running over the entire available length, the length of the sound track being thus much greater than the length over which the main or driving spring may advance the strip. The sound track carrying strip is, however, advanced by a single sprocket wheel driven by a drum which is under the tension of the main or driving spring. The spring according to the invention is wound by a weight which is brought into operation by turning the toy or doll upside down. During the downward movement of the weight along a fixed guide, the weight engages a projecting spring element mounted on a carriage which is attached to the spring drum and moves the carriage along a swingable guide rail until the weight reaches the end of the stroke and strikes a spring arm connecting the lower end of the swingable guide rail along which the carriage advances with the fixed guide along which the weight advances. The resulting deformation of the spring arm causes an outward movement of the guide rail which disengages the weight and the carriage and the tensioned main driving spring is now in a position to move the sound track past the sound box provided with a needle, thus producing a sound effect which consists, for instance in several words.

On account of the great length of the sound strip, however, the spring 12 can only move the sound strip through a fraction of its length, and therefore, when the next winding operation has been performed, other sounds are produced or other words are spoken, thus making the toy or doll more attractive on account of the variety of sounds which can be produced.

The sound track has to be arranged in such a way as to permit the above stated operation.

Figure 12:
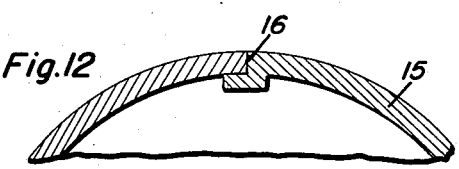
Figure 12 is a fragmentary sectional plan view through the body of the doll.

As will be seen in Figure 1 of the drawings, the entire mechanism is housed in the interior of a toy, such as a doll, the body 15 of which may be made of any suitable material. The body of the doll must be divided and consists of two parts in order to permit the insertion, the two parts being afterwards joined, as shown at 16 in Figure 12, by an adhesive, solvent, or other means. The hollow interior of the body 15 of the doll is preferably provided with brackets 17 for holding the base plate of the mechanism. The head 18 or upper portion of the toy may form a separate piece mounted on the body 15 in the way indicated in my earlier Patent 2,212,623 or it may be solidary with the body 15 and may carry the amplification means for the sounds which are produced by the mechanism, as will be explained below.

The entire mechanism is preferably mounted on a base plate 20, made of wood, plastic material, or the like, and which is arranged in a vertical position with the doll or toy placed upright. The base plate is provided with a slot 66 and with a projecting shelf or ledge 82 near its top edge. The function of the slot and the ledge will be described below.

Figure 7:
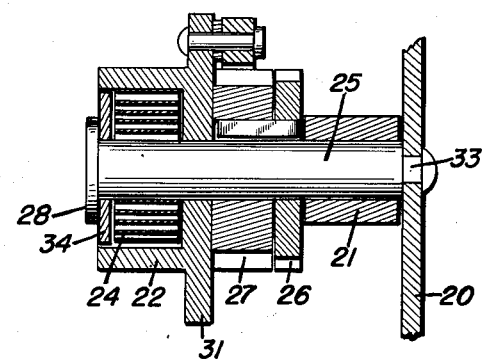
Figure 7 is an elevational sectional view through the main shaft, the spring drum and the mechanism associated with the same, the section being taken along line 7—7 of Figure 2.
Figure 6:
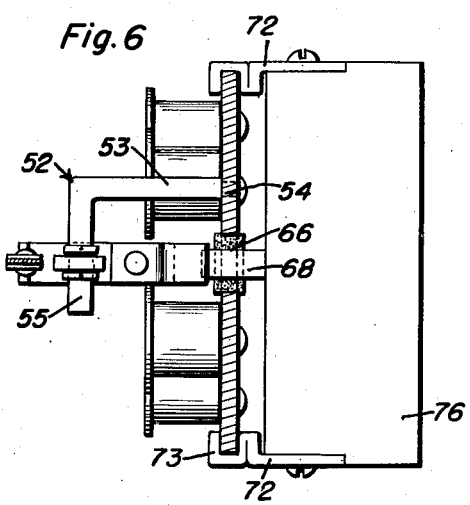
Figure 6 is a plan view of the mechanism partly in section, the section being taken along line 6—6 of Figure 2.

As already mentioned, the base plate is held in vertical position on the brackets 17. From this base plate 20, the main drive shaft 25 projects as seen in Figure 7, which shaft is rotatably held on said base plate 20 by means of a rivet or a bolt 33. The shaft 25 carries a spring drum 22 housing a coil spring 24. A ratchet wheel 27 and a main gear wheel 26 are both keyed to each other and are held at a certain distance from the base plate by means of the spacing roller 21 which is freely movable on shaft 25 and which also performs a function to be described below. The spring drum 22 is rotatable on the shaft and its hollow interior housing the spring 24 may be closed by means of a shield 34. The shaft may carry a disk 28 at its end for preventing an axial displacement of the drum and of the entire assembly.

The spring drum 22 is provided with a projecting flange 31 on which the pawl 30 is mounted engaging the ratchet wheel 27. The pawl is swingably mounted on the pin 32 riveted to and projecting from the flange 31. A small spring 36 keeps the pawl in engagement with the teeth of the ratchet wheel.

The coil spring 24 is fixed at its inner end on the shaft 25 by means of a pin or bolt 23, or the bent end of the spring may be fixed in a slotted portion of the shaft in a well-known manner. The outer end of the spring 24 is fixed to the drum 22 by means of the rivet 35 (Figure 10) which may also serve to fix one end of the belt 40. The other end of the belt 40 is attached to the carriage 42 by means of a slotted bracket 44 projecting from said carriage, into the slot of which the end of the belt, which is provided with an eye, is inserted and is held by means of a rivet 43.

The carriage 42 consists of an angularly bent member with a horizontal arm 45 at the end of which a carriage spring 46 is mounted by means of a rivet 47. The spring 46 is of substantially triangular or trapezoidal shape, one end being free and the attached part being slightly bent upwardly so that a sharp edge or apex results on the end of the spring which is turned toward the base plate 20.

The carriage is arranged for the purpose of tensioning or winding up the spring 24, as will be described below. It is provided with a slot 48 through which a guide rail 50 passes, the said guide rail being pivotally suspended on an arm or bracket 52 which is bent at right angles, one section 53 being perpendicular to the base plate 20 and fixed thereon by means of a rivet, while the other section 55 is parallel to the base plate. The arm is of circular cross-section and the section 55, which is parallel to the base plate, forms a pivot on which the head 56 of the guide rail 50 may be pivotally suspended. Fixation disks may be held on both sides of the head 56 by means of splines to prevent axial movement of the head along the arm section 55.

The under side of the head 56 is provided with a buffer plate 57 in order to absorb shocks.

At the lower end of the guide rail 50, a lower head 58 is provided which is surrounded by a shoe 59 forming the end of a curved elastic spring arm 60 attached to the base plate 20 by means of a rivet 61 on one side and attached to the guide rail 50 by means of the shoe and a pin or other connection 63 passing through eyes 64 of the shoe and through the eye 62 of head 58 of the guide rail.

Figure 11:
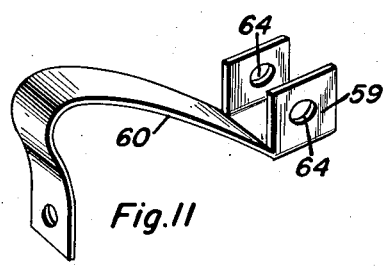
Figure 11 is a perspective view of the lower spring arm of the carriage.

The elastic spring arm 60 is upwardly curved, as seen in Figure 11, and is easily deformable if pressure is applied on the curved portion. Such pressure will flatten the curved portion of the arm 60 and, as one end of the curved elastic arm is attached to the base plate 20, the other end will thereby be moved outwardly, carrying the head 58 with it and thereby moving the guide rail 50 around its pivot 55 to a limited extent.

Along the vertical base plate 20, the actuating weight 70 may slide which provides the power necessary to wind the spring 24 in the spring drum 22. The weight must be suitably chosen and is of any suitable shape. Preferably, a prismatic body is used, and said body is guided along the outer edges of the base plate 20 by means of guide arms 72 which are screwed or otherwise fixed on the sides of the weight 70 and which are provided with grooved or channel-shaped projecting portions gripping the edges of the base plate and sliding along the same.

The base plate, as has already been stated above, is provided with a longitudinal slot 66 cutting through its middle portion and through its lower portion into which a ledge or an actuator strip 75 projects. The actuator strip may be attached to the under side of the prismatic body forming the weight and may project to the extent necessary to engage the tip of spring 46 when the weight moves down along the base plate 20, such engagement of the spring 46 occurring when the carriage 42 is in its normal position. When the toy or doll is turned upside down, the weight slides to the upper end as far as the arm 75 sliding in the slot 66 will permit. A rubber block 68 arranged at the end of the slot will dampen the shock of the impact of the arm against the end of the slot when the weight is moved towards the upper end. When the toy or doll has been returned to its normal or upright position, the weight 70 slides down again engaging the carriage spring 46 by means of its actuator strip 75, and finally the weight drops on the elastic spring arm 60 which cushions the shock and which is also flattened by the impact of the weight.

The sound producing elements of the toy or doll comprise the sound strip 18 which is an endless, flexible and unbreakable acetate Celluloid strip on which the sound records are made and which, therefore, carries the sound track which is cut into its surface. The strip is preferably easily interchangeable and it is provided with perforations on one side. The perforations are engaged by the teeth of the sprocket wheel 85 mounted on a stub axle 84 which is held in the upper portion of the base plate 20. A drive gear wheel 83 is solidary with the sprocket wheel or is connected for rotation by means of a key with said sprocket wheel, said gear wheel meshing with the gear wheel 26 which is keyed for rotation with the ratchet wheel 27. Therefore, the rotary motion of the ratchet wheel 27 which is actuated by the pawl 30 and the drum 22 is transmitted to the sprocket wheel 85. When the latter is rotated, the strip is advanced as long as the spring 24 drives the drum 22 in the proper direction.

In order to make the doll or toy "talk" a few words or a complete sentence, or in order to produce protracted sound effects, the sound strip is preferably of as great a length as possible. It may be much longer than the strip length which may be advanced upon a single winding of the spring 24. For this purpose, the sound strip has a number of parallel sections joined by short transverse sections. As will be seen from Figures 1 and 2, the strip runs from the sprocket wheel 85 over a short transverse section and over the spacer roller 21 on shaft 25; from there it runs vertically down to the lower end of the base plate. A guide roller 96 is provided at this end over which the strip is trained, reversing its direction. The next section is again vertical but runs upwardly towards the upper end of the base plate in Figure 2 and over the guide roller 97, and from there in substantially vertical sections the strip runs over the rollers 95, 94 located near the upper and lower ends of the base plate, respectively, towards guide roller 93 by means of a short transverse section; the strip then runs along the lower edge of the base plate 20 and over guide roller 92 and from there in a vertical upwardly directed section towards the guide roller 91 which is located slightly above the sprocket wheel 85. Between the said guide roller 91 and the sprocket wheel 85, the strip 80 runs transversely and is somewhat inclined towards the horizontal and this section is preferably kept under spring tension by means of a curved spring 86 sliding on the said slightly inclined section. The curved spring 86 is mounted on the transverse shelf plate 82 projecting from the base plate 20 near the upper edge of the same.

It will be noted that on both sides of the sprocket wheel 85 transverse sections of the strip 80 are arranged so that said sprocket wheel produces a reversal of the direction of movement and the arc covered by the strip 80 is approximately 180°.

The strip is also firmly pressed against the sprocket wheel 85 by this arrangement and near the point where the strip runs over the sprocket wheel, the needle 99 of a sound box 100 rides over the sound track of the moving strip 80, the strip being firmly supported at this point and any tendency of the strip to "float" or to become loose is suppressed by the described arrangement.

The sound box 100 is of the conventional type having preferably a conical diaphragm firmly held therein by means of a cushioning ring with a needle attached to the apex of the cone. This sound box is resiliently mounted on the shelf 82 of the base plate 20. Preferably the sound box has a tubular extension 101 screwed into or frictionally held in a rubber cushion 102 which is tubular and which may be provided with flanges. The tubular rubber cushion is inserted into and is held within an opening 103 in the shelf 82.

The spring 51 keeps the sound box under a slight tension and, while maintaining an all-around resiliency, tilts the sound box and the needle 99 slightly, thus keeping all parts under some tension while producing the correct position of the needle with respect to the sound strip. Obviously, the needle may make small movements in all directions and may follow the sound track even if a small deviation of the same occurs on account of small relative movements of the parts.

In the example above described, there are six longitudinal sections of the sound track carrying strip 80, each approximately of the full length of the base plate 20, and, moreover, there are three short transverse sections. Therefore, a considerable length of strip is available. On a medium size model of a doll, it was found that there was sufficient space for about seven sections, each containing around four words or sound effects of average length. Each section of four words is preferably preceded by a relatively long blank section of the sound track, the length of which is about one-half the length necessary for one word. The purpose of the blank sound track consists in the elimination of any defective reproduction of the sound due to the sudden pull of the strip at the beginning of each operation.

It may be mentioned, by way of example, that in the above-mentioned medium-size model, it was found that the speed of the sound track was such that a space of one inch was necessary for one word so that the entire length of the sound strip was about 31.8 inches equal to 28 sections of one inch and seven blank sections of around one-half inch.

As the sound box will not produce by itself a sufficiently audible sound, it is necessary to provide an acoustic amplifier or a resonance box. This is preferably provided in the head of the figure of the doll, as shown in Figure 1. A funnel-shaped sound amplifier 111, similar to a horn, may either be inserted or may be directly molded in the interior of the neck, or the lower head portion of the doll. The end 112 of this funnel-shaped portion may be connected with the sound box by means of a flexible hose 115. The upper portion of the head may function as a kind of resonance box from which the sound may emanate through suitable openings 116 such as the mouth or the ears of the doll, and additional openings may, if necessary, be provided and may be concealed below the hair of the head of the doll.

The mechanism can be inserted into any toy, such as dolls, animals, comic character dolls, and the like, where a talking mechanism is desirable and where enough room is available for the mechanism. In most cases, the interior of the toy has to be designed specially for supporting the base of the mechanism at the four corners, as indicated at 17, and, as above stated, also a built-in amplifier for the sound is desirable. The toy is therefore manufactured in two equal parts, joined along the longitudinal plane of symmetry in order that the mechanism may be inserted and may be held securely at the corresponding supports. After the insertion, the two equal parts of the toy or doll are joined, either by means of screws or by a permanent binding medium such as a glue or solvent.

The operation of the device will be clear from the above description. If it is assumed that the spring 24 is not tensioned, it is necessary to tension the spring by turning the toy or doll upside down so that the weight 70 slides toward the end shown as the upper end of the doll, the strip 75 sliding within the slot 66 of the base plate 20 until it reaches the end of the slot. During such movement, the actuator strip 75 is moved past the carriage spring 46, lifting the tip of the spring which yields on account of its elasticity. The toy or doll is then again turned around so as to be in its normal position. When the weight 70 now moves down, the tip of the actuator strip 75 again engages the carriage spring 46 during downward movement. The spring 46 is, however, pressed against the carriage plate 45 when the actuator strip presses on its upper side, and therefore said spring cannot be moved out of engagement or out of the path followed by the actuator strip 75. The weight 70, therefore, moves the carriage 42 along guide rail 50. During this movement, the belt 40 which has been wound on drum 22 is pulled down, rotating the drum. During this rotation, the pawl 30 slides over the ratchet wheel 27, which remains at rest while the spring 24 which is fastened to the drum is tensioned.

When the weight 70 is moved down into its lowermost position and the belt has been unwound completely, the weight hits the lower spring arm 60, flattening it to a certain extent. Thereby the lower arm 60, which during this downward movement held the rail 50 in its vertical position, spreads and its movable end attached to the pivoted rail 50 moves laterally. This lateral movement also causes a lateral movement of the guide rail 50 and of the carriage and carriage spring, thus withdrawing the carriage spring 46 from engagement with actuator strip 75. The carriage is thus released and thereby also the spring 24 is released, moving the carriage upwardly, while at the same time turning the drum 22 in the direction in which the pawl 30 engages the teeth of the ratchet wheel 27. Thereby the ratchet wheel is moved in the direction of the arrow in Figure 9.

This movement is transmitted to the main gear wheel 26 which, in its turn, transmits the movement to gear wheel 83 coupled with the sprocket wheel 85. Therefore, the sound record strip 80 is moved to a predetermined extent which corresponds with the winding of the spring 24. The strip thus moves for, say one section, and the sound box reproduces the sounds or the speech recorded on this section.

When the sound strip 80 stops because the coil spring is again unwound, the doll or toy must again be turned upside down in order to tension the spring. Now the next section of the sound strip moves past the sound box 100, the needle 99 producing other sounds. Therefore, the toy may produce a great variety of different sounds, words, or short phrases, the delivery starting automatically with the turning of the toy or doll.

It will be clear that several units of the mechanism which have been described above may be changed or replaced and that the specific construction of other units may differ from the one shown by way of example without in any way departing from the essence of the invention as defined in the annexed claims.

Having described the invention, what is claimed as new is:

1. A mechanism for producing sounds in toys, comprising a hollow toy body, a base plate held therein, an endless flexible sound strip carrying a record, said sound strip being disposed in a number of substantially parallel sections running along said base plate approximately from end to end, a sound box resiliently mounted on said base plate with a needle sliding on said record carrying sound strip, a sprocket wheel for driving said sound strip, a spring drum and a coiled spring within said drum for rotating said drum, a ratchet wheel and gear wheel transmission between said drum and said sprocket wheel, a slidable weight sliding along said base plate and adapted to wind the coiled spring in the drum under the influence of gravity, a flexible member attached to the drum and adapted to be wound thereon, a slidable carriage and a pivoted guide rail for guiding the carriage during its movement, a member projecting from said carriage into the path of the weight moving under the influence of gravity along the base plate, an expansible member connecting the end of the guide rail and the base plate, said member being arranged in the path of the weight and struck by the latter at the end of its stroke, said expansible member shifting the guide rail and the carriage moving along it laterally under the impact of the weight, disengaging the projecting member on the carriage from the weight and starting a rotational movement of the drum and of the sprocket wheel and an advance of the record carrying sound strip.

2. A mechanism as claimed in claim 1 wherein the expansible member consists of a curved spring fixed to the base plate and holding the end of the guide rail, the curved portion of the spring being turned towards the weight so as to be flattened by the impact of the weight.

3. A mechanism as claimed in claim 1 wherein the member projecting from the carriage and engaging the weight consists in a triangular spring with a free end fixed on the carriage and adapted to be bent and to swing away from the weight when the weight passes in the direction towards the normally upper end of the base plate, while engaging the weight and transmitting its movement to the carriage during the movement of the weight towards the lower end of the base plate.

4. A mechanism as claimed in claim 1, comprising a rubber sleeve surrounding a portion of the sound box held by said base plate, said rubber sleeve permitting limited all-round movement of the sound box and a spring biasing the sound box in one direction.

5. A mechanism for producing sounds in toys, comprising a hollow toy body, a base plate held therein, an endless flexible sound strip carrying a record, said sound strip being disposed in a number of substantially parallel sections running along said base plate approximately from end to end, guide rollers on said base plate for guiding the sound strip sections, a sound box and needle sliding on the record carrying sound strip, a sprocket wheel for advancing said sound strip, a spring drum and a spring therein, and means operated by said spring drum for driving said sprocket wheel, when driven by the spring, tensioning means for said spring, said means including a flexible belt fixed on the drum and adapted to be wound around the same, a slidable carriage attached to said belt provided with an arm for winding the spring, said carriage arm being provided with a guiding opening, a resilient spring member at the end of the arm projecting outwardly, a pivoted guide rail passing through the guiding opening of the carriage arm and guiding its sliding movement, a bent arm projecting from the base plate above the uppermost portion of the carriage forming a pivot for the guide rail, an expansible curved spring connecting the base plate and the lowermost point of the guide rail, said spring, when pressed on its curved portion, being flattened and thereby swinging the lowermost point of the guide rail away from the base plate around its pivot at the upper end, a weight adapted to slide along the base plate, means to guide said weight, said weight being moved towards the upper end of the base plate when the toy is turned upside down and moving towards its lower end when the toy is in its upright position, an actuating member on said weight engaging the curved spring member on the carriage to the extent of moving the carriage along the guide rail, said weight when hitting the expansible curved spring and flattening the same moving the resilient spring member on the carriage out of engagement with the actuating arm and starting the turning of the drum by the tensioned drum spring.

PEDRO STRAUSS.

REFERENCES CITED

The following references are of record in the file of this patent:

UNITED STATES PATENTS

| Number | Name | Date |
|---|---|---|
| 1,104,182 | Funnell | July 21, 1914 |
| 1,175,205 | Turner | Mar. 14, 1916 |
| 2,212,623 | Strauss | Aug. 27, 1940 |